Figure 1:
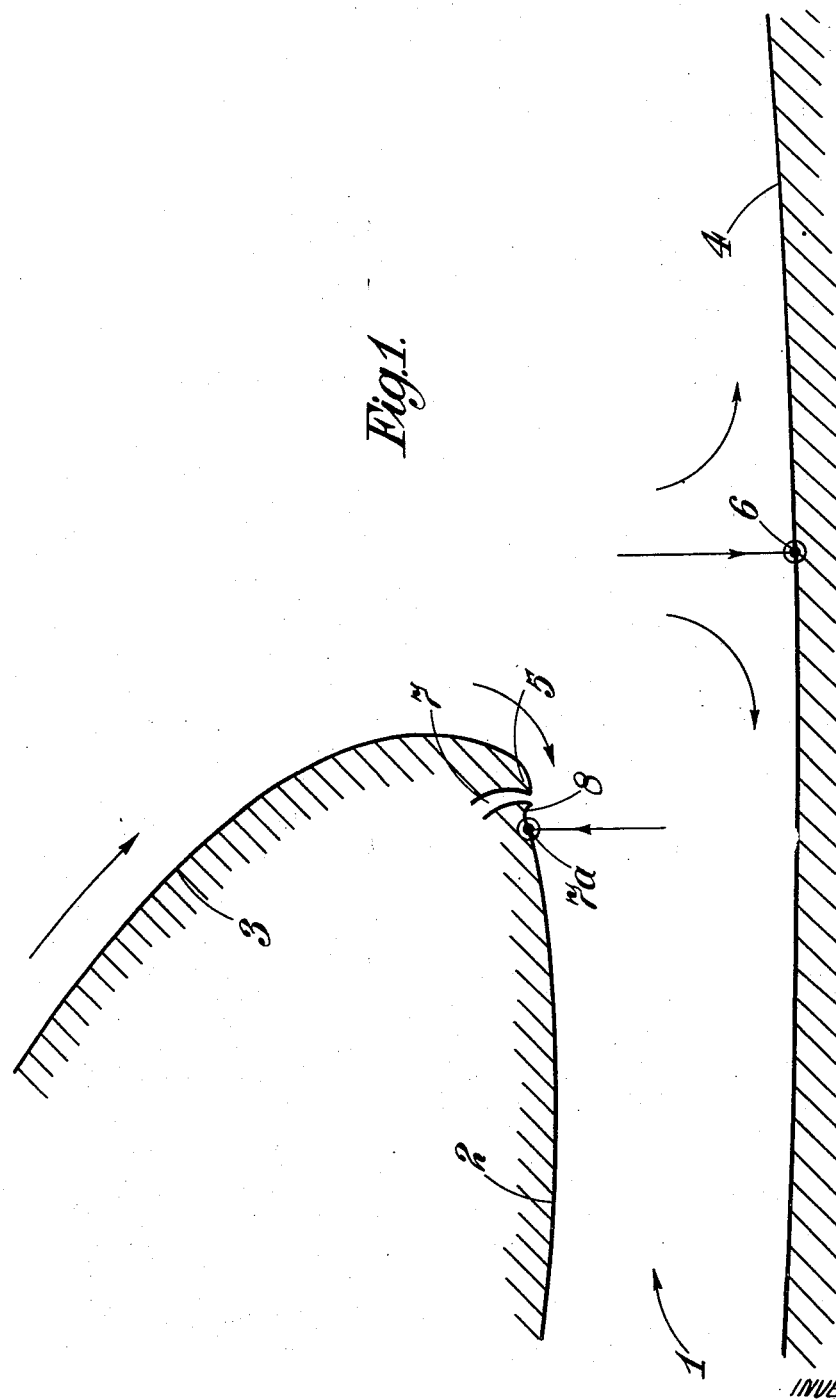

Dec. 7, 1954  A. A. GRIFFITH  2,696,075
FLUID-SOLID CONTACT SURFACE WITH
REARWARDLY-FACING FLUID INTAKE
Filed July 29, 1949  2 Sheets-Sheet 1

INVENTOR
A. A. GRIFFITH
BY Wilkinson & Mawkinne
ATTYS.

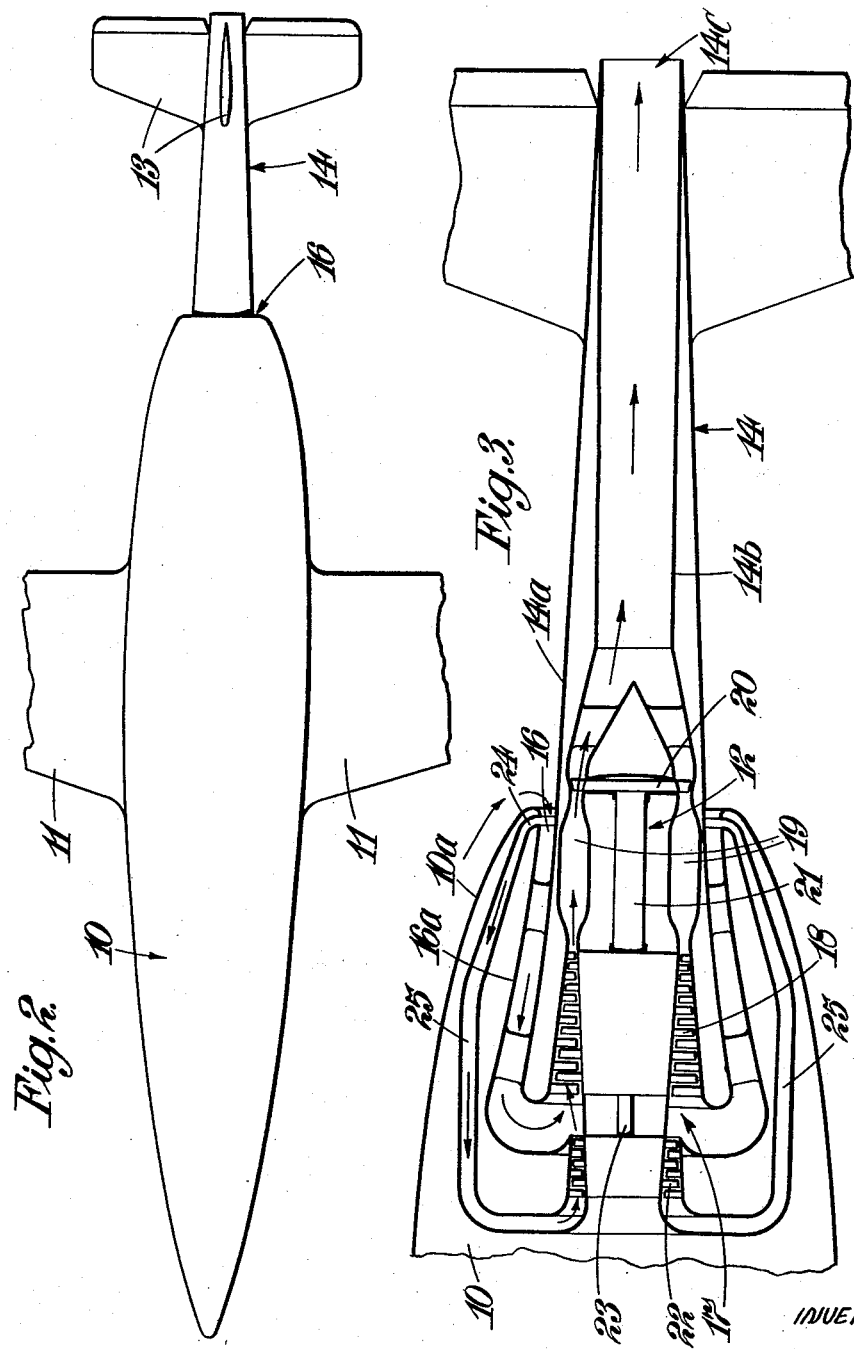

ced Dec. 7, 1954

2,696,075

FLUID-SOLID CONTACT SURFACE WITH REARWARDLY-FACING FLUID INTAKE

Alan Arnold Griffith, Derby, England, assignor to Rolls-Royce Limited, Derby, England, a British company Application July 29, 1949, Serial No. 107,505

Claims priority, application Great Britain August 20, 1948

7 Claims. (Cl. 60—35.6)

This invention relates to fluid-solid contact surfaces such as are found in aircraft.

In an aircraft, it is usual, for example, for the supplying combustion air to the engine, to provide an air-intake in the surface of the aircraft which intake faces forwardly in the direction of flight so that the air pressure within the air-intake is dependent on the forward speed of the aircraft. Such an air-intake, however, may disturb the air-flow over the adjacent portions of the aircraft surface and may prevent a good stream-line flow from being obtained over the surface. Contrariwise, if the air-intake is rearwardly facing, an improved stream-line flow can be obtained, but the pressure within the air-intake is not augmented with respect to the ambient pressure so that, for instance, the engine will have to act as an air-pump instead of being "supercharged" by the velocity head.

This invention has for an object to provide an improved construction of fluid-solid contact surface so that an intake for the fluid can be arranged in the solid surface to face rearwardly of the direction of travel of the solid surface with respect to the fluid whilst maintaining the supercharging effect within the intake.

In the specification of my British Patent No. 578,763, I have described a fluid-solid contact surface so arranged that, in the relative motion of the fluid and solid, break-away of flow and thus an increase of drag or other losses are substantially avoided. This effect is achieved by providing a slot or slots in the solid surface through which the boundary layer is sucked away and by so shaping the surface of the solid that no rise of pressure occurs on the surface in the general direction of fluid flow except in the interval between the slot, or each slot, and its associated stagnation point where the boundary layer is locally reversed in direction. This can be done by providing that the surface curvature changes suddenly in passing across the slot in the sense of being less convex to the fluid on the downstream side of the slot than on the upstream side. In this connection a concave surface is treated as being negatively convex and thus as being less convex than a true convex surface. In addition it may be arranged that there is a sudden change of direction of flow over the surface at the slot in the sense to form a re-entrant angle in the solid surface. In general it is found that the surface is convex to the fluid upstream of the slot and concave downstream with the greatest arithmetical curvature at the slot in each case.

According to this invention, a fluid-solid contact surface is provided with an intake for the fluid facing rearwardly of the direction of motion of the solid in the fluid and is characterized in that the surface upstream of the intake is turned into the solid to form a lip of the intake, in that a boundary layer suction slot is formed just inside the lip with the surface of the solid so curved that no rise of pressure occurs on the surface in the general direction of flow across the slot except in the interval between the slot and its associated stagnation point, and in that the fluid-solid surface is such that a stagnation point occurs in a neighbouring streamline downstream of the intake. In this manner, the intake has a high efficiency since the greater part of the intake compression is done externally as with a forward facing intake, and has the known advantages of a rearward intake.

The surface of the lip upstream of the slot may be made convex and the portion of the surface of the intake just beyond the slot may be made concave to achieve the desired pressure distribution in the region of the slot.

The invention has an especially useful application in an aircraft having the engines at its rear, for providing the air-intake for the combustion air. In such an aircraft, a considerable proportion of the profile drag of the aircraft is to be found in the boundary layer at the after end of the body; it is therefore to be expected that a high efficiency rear intake, as can be obtained by adoption of the invention, will permit the realization of at least a useful proportion of the gain in propulsive efficiency which is theoretically possible by pumping away the boundary layer instead of neutralizing its drag by an independent jet.

The accompanying drawings illustrate diagrammatically the profile of the air intake arranged in accordance with this invention for supplying combustion air to a gas-turbine engine installed in an aircraft, and an aircraft embodying the air intake.

In the drawings, Figure 1 is a radial section showing the profile of the mouth of the air intake, Figure 2 is a plan view of the aircraft with parts broken away, and Figure 3 is a sectional view of the rear portion of the aircraft showing the location of the engine and some constructional features.

Referring to Figure 1, the air intake 1 is annular in form and is defined between the inturned portion 2 of a nacelle, fuselage or other aerofoil surface 3 and the surface 4 of a jet pipe which extends from the engine rearwardly beyond the air intake 1.

The surface 3 is in the form of an approximate logarithmic spiral and is convex with its maximum curvature at the lip 5 around the mouth to air-intake. The surface 4 of the jet-pipe is also formed as a logarithmic spiral and is concave and the shapes of the surfaces 3 and 4 are such that a stagnation is formed in the air flow at a location 6 downstream of the entry to the air-intake.

The surfaces 2, 3 and 4 are aerodynamically designed to produce an annular rearwardly facing intake, the particular curvatures of which surfaces form no part of the invention except, of course, these surfaces follow mathematical equations in conformance with proper aerodynamic design of airfoil surfaces so as to produce a stagnation point approximately at points 6 and 7a as viewed in Figure 1 of the drawing.

To prevent the break-away of the air entering the air-intake and thus loss of the velocity head, a suction slot 7 is provided just inside the lip 5 and the surface of the intake just downstream of the slot 7 is made concave, as indicated at 8 and to have its maximum negative curvature at the slot 7. With this arrangement there is no rise of pressure on the surfaces 2, 3 in the direction of air flow over them except in the interval between the slot 7 and its associated stagnation point 7a.

With such an arrangement an efficient rearwardly facing air-intake is obtained.

Referring now to Figures 2 and 3, the aircraft illustrated comprises a fuselage 10 in the form of an aerodynamic body having a maximum transverse dimension rearwardly of the mid-chord, a wing structure 11 of any convenient form, a gas-turbine engine power-plant 12 housed in the rear end of the fuselage 10, and a tail unit 13 carried on the end of the jet-pipe structure 14 through which the exhaust gases from the engine are conveyed to a propelling nozzle provided at the outlet of the jet pipe structure.

The air intake 16 for the supply of combustion air to the engine 12 faces rearwardly and the outer skin 10a of the fuselage, the wall 16a of the air-intake 16 and the outer skin 14a of the jet-pipe structure 14 which outer skin 14a is extended forwardly to form the inner wall of the air intake and to enclose the engine 12, are given respectively the shapes indicated in Figure 1 for the parts 3, 2 and 4; any necessary modifications being made from the two-dimensional profiles of Figure 1 to reduce the intake velocity if it is too high.

The air flowing into the air intake 16 flows forwardly to the inlet 17 of the engine main compressor 18 wherein the air is compressed, and is delivered by the compressor 18 to combustion equipment 19 wherein fuel is burnt in the compressed air. The products of combustion together with any excess heated air then passes through a turbine 20 to drive it, the turbine being connected to the compressor 18 by a shaft 21 to drive the compressor 18. The turbine 20 also drives an auxiliary compressor 22 connected to compressor 18 by a shaft 23, the auxiliary compressor 22 acting as a suction pump for drawing off the boundary layer through a slot 24 (corresponding to slot 7 of Figure 1) and ducting 25 and delivering the air so drawn off into the inlet 17 of the main compressor 18.

The exhaust gases from the turbine 20 pass into the jet pipe proper 14b and pass at high velocity from the jet-pipe to atmosphere through a nozzle orifice 14c located beyond the tail unit 13.

With an aircraft as just described, the air flow over the fuselage 10 is not disturbed by the provision of the rearwardly facing air intake 16 and at the same time the air compressor 18 is supercharged by the velocity head due to the forward speed of the aircraft.

I claim:

1. In an aerodynamic body having an annular air intake duct, a first surface providing the outer wall of an annular air intake duct leading into said body; a second surface outside said first surface and providing part of the external surface of said body and joining with said first surface at their rearward ends to provide a mouth to said air intake duct which faces rearwardly of the direction of movement of the body; a boundary layer suction slot at the junction between said first and second surfaces; said second surface being convex upstream of said slot and shaped to provide a lip adjacent said slot and said first surface being concave downstream of said slot so that there is a sudden change of curvature at the slot whereby no rise of pressure occurs over said first and second surfaces except between said slot and the stagnation point associated with said slot and on said first surface; and a further surface which extends forwardly of said mouth to provide the inner wall of said intake duct and rearwardly of said mouth to provide a surface on which a further stagnation point occurs.

2. An aerodynamic body as claimed in claim 1 in which said further surface is concave rearwardly of the mouth of the intake in the form of an approximate logarithmic spiral.

3. An aircraft having a part of its structure formed as an aerodynamic body as claimed in claim 1 and having an air consuming plant housed within the body to be supplied with air through said rearwardly facing intake.

4. An aircraft having part of its structure formed as an aerodynamic body providing a rearwardly facing annular air intake, said body having a first surface forming a boundary surface of the intake, being turned inwardly and forwardly to within the body to form a lip around the mouth of the intake; a boundary layer suction slot formed in said surface just inside the lip; suction pump means connected with the slot; an inner intake structure forming a further boundary surface in the intake located within and spaced from said first surface and extending rearwardly from the mouth of the intake; and an air consuming power plant housed within the body and connected with the intake to be fed with air therefrom; the said first surface being convex at said lip upstream of the slot and concave just downstream of the slot so that no rise of pressure occurs on the surface except in the interval between the slot and its associated stagnation point on the first mentioned surface, and said inner structure presenting a further surface rearward of the mouth of the intake on which a stagnation point occurs.

5. An aerodynamic body as claimed in claim 4 in which said further surface is concave rearwardly of the mouth of the intake in the form of an approximate logarithmic spiral.

6. An aircraft as claimed in claim 5, wherein the powerplant is a gas-turbine engine and the portion of the inner surface structure extending rearwardly beyond the mouth of the intake is formed as a jet-pipe structure terminating at its rearward end in a propelling nozzle.

7. An aircraft as claimed in claim 6, wherein the gas-turbine engine comprises a main engine air-compressor whereof the inlet is connected with the air-intake to take in air therefrom for consumption in the engine, and an auxiliary air-compressor forming the suction pump means and having its inlet connected with the suction slot and its delivery connected with the inlet to the main engine air-compressor.

References Cited in the file of this patent

UNITED STATES PATENTS

| Number | Name | Date |
|---|---|---|
| 2,157,281 | Coanda | May 9, 1939 |
| 2,383,385 | Heintze | Aug. 21, 1945 |
| 2,431,592 | Stalker | Nov. 25, 1947 |
| 2,449,022 | Stalker | Sept. 7, 1948 |
| 2,507,611 | Pappas et al. | May 16, 1950 |
| 2,517,524 | Beck et al. | Aug. 1, 1950 |

FOREIGN PATENTS

| Number | Country | Date |
|---|---|---|
| 588,095 | Great Britain | May 14, 1947 |